United States Patent [19]

LeGrand

[11] 4,116,607

[45] Sep. 26, 1978

[54] THREAD FORMING AND NECK FINISHING APPARATUS

[75] Inventor: Richard Webster LeGrand, Wilmington, Del.

[73] Assignee: Hercules Incorporated, Wilmington, Del.

[21] Appl. No.: 813,575

[22] Filed: Jul. 7, 1977

Related U.S. Application Data

[62] Division of Ser. No. 754,203, Dec. 26, 1976, Pat. No. 4,065,535.

[51] Int. Cl.$^2$ ............................................. B29D 23/03
[52] U.S. Cl. .................................... 425/525; 425/529
[58] Field of Search .................. 425/525, 529, 530

[56] References Cited

U.S. PATENT DOCUMENTS

| 3,209,401 | 10/1965 | Mehnert | 425/525 |
| 3,531,556 | 9/1970 | Mehnert | 425/525 X |
| 3,969,060 | 7/1976 | Rosenkranz et al. | 425/525 |

*Primary Examiner*—Richard B. Lazarus
*Attorney, Agent, or Firm*—James W. Peterson

[57] ABSTRACT

The invention is a process and apparatus for biaxially blow molding hollow plastic articles to provide a finished neck of axially oriented material in the molding step. One end of a plastic parison is placed over a blow pin positioned between separable mold halves. The parison is then axially oriented and necked down over said blow pin. A crammer sleeve is positioned over the blow pin to cram axially oriented material into the neck finishing cavities when the molds are closed over said blow pin and parison.

1 Claim, 8 Drawing Figures

THREAD FORMING AND NECK FINISHING APPARATUS

This is a division of application Ser. No. 754,203, filed Dec. 26, 1976, now Pat. No. 4,065,535.

BACKGROUND OF THE INVENTION

Blow molding of synthetic resins to form receptacles has previously been performed by two methods — one called the hot melt method which involves forming a resin into a tubular form by an extruder or injection molding machine and blowing it while it is in the molten state; and the other, called the parison method, which involves forming the resin into a tubular form, cooling the formed article, again heating it to melt it, and blow molding it while it is in the molten state. In recent years, the biaxial stretching blow method was developed which comprised the steps of heating a parison once cooled to a stretching temperature, stretching it in the longitudinal or axial direction, and then blow molding it. This method has been used to form receptacles of vinylidehe chloride resins or polypropylene resins in order to improve by orientation the physical properties of the product, such as drop strength or transparency. Biaxially oriented containers have been made by clamping the preform parison with neck cavities before axial orientation of the parison. The end result is an oriented container having a finished but unoriented neck region. The neck region, therefore, lacks the clarity and strength that is partially obtainable in at least an axially oriented material. To overcome this problem, processes have been developed which provide some orientation in the neck region, for example, see U.S. Pat. No. 3,651,186 to J. N. Hall which discloses process and apparatus for axially orienting a parison and then partially unorienting material in the neck region to allow internal fluid pressure to blow out a portion of the parison into neck thread cavities. U.S. Patent application, Ser. No. 614,292, now abandoned, a commonly owned application, discloses method and apparatus for forming threads on an axially oriented parison in which an expandable internal mandrel in the neck region forces the axially oriented parison into thread forming cavities. The instant invention provides another method and means for neck finishing an already axially oriented parison. The benefit of the instant invention is the provision of a finished neck from axially elongated material, thereby providing a finished container with superior strength, clarity, and other mechanical properties inherent in oriented polymers, such as, polypropylene.

OBJECTS OF THE INVENTION

It is a primary object of the instant invention to provide method and apparatus that will produce a biaxially oriented container having a finished neck region that has been axially oriented.

It is another object of the instant invention to provide high speed and efficient method and apparatus for production of finished biaxially oriented containers.

It is yet another object of the instant invention to provide a method and apparatus that will produce a biaxially oriented container with a finished neck region completely within the mold and not requiring additional trimming.

Still another object of the instant invention is to provide a process to produce a bottle having greater cross-sectional area in the neck than in the remainder of the blown bottle.

SUMMARY OF THE INVENTION

The purpose of the instant invention is to provide method and apparatus to produce a biaxially oriented container having a finished neck wherein said neck region comprises axially oriented material. To accomplish this purpose, the instant invention provides in combination a blow pin and crammer sleeve, said blow pin being used to convey gasses into the parison to expand the parison into the mold means, the outside diameter of said blow pin equalling the finished inside diameter of the bottle neck, said crammer sleeve being positioned over a portion of said blow pin allowing necking down of the parison during axial orientation of said parison, said crammer sleeve then being employed to force said necked down parison into complementary neck finishing cavities.

DESCRIPTION OF THE PREFERRED EMBODIMENT

This invention came about because of the need to produce a bottle that has a greater cross-sectional area in the neck than in the remainder of the blown bottle. One particularly difficult problem is to produce large containers with standard size thread areas. This is because if a small parison is used so as to give a small neck and thread area, the walls of the parison will be thinned unduly on expansion to conform to the shape of the mold. Conversely, if a parison is utilized which has sufficient polymer to form walls of a relatively large article, the diameter of the thread and neck area will be too large. The present invention allows a uniform walled parison 17 to be stretched a given amount until the material has thinned out enough in the neck section to provide an oriented neck with the right amount of material to fill the mold neck cavity at which time further thinning down is stopped by the blow pin 11 (sizing mandrel). The remainder of the parison 17 can then be further thinned down by stretching to produce the thinner required wall section in the blown portion of the bottle. This is all made possible by the fact that the material will not reduce in O.D. or wall thickness once the I.D. is prevented from getting smaller by the blow pin 11 (sizing mandrel).

Figure 1:
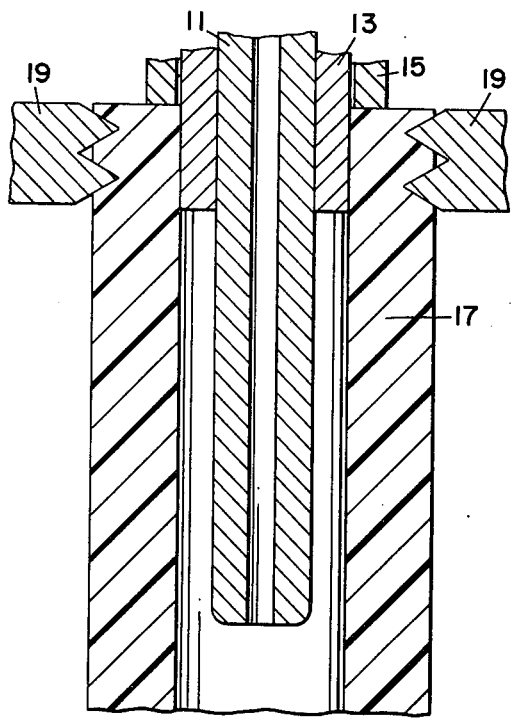
FIG. 1 is a full cross-sectional view of the apparatus of the instant invention.

FIG. 1 shows a parison 17 clamped around the end of crammer sleeve 13 by the clamping means 19. The parison 17 of partially crystalline orientable material has been heated to just below the crystalline melting point. Crammer sleeve 13 fits over blow pin 11 (sizing mandrel) and is connected to an actuating mechanism (not shown) which moves crammer sleeve 13 up and down over blow pin 11. The outside diameter of the blow pin 11 and the inside diameter of the crammer sleeve 13 are essentially the same as the inside diameter of the finished container neck. The outside diameter of the crammer sleeve 13 is the same as the outside diameter of the finished container neck at the base of neck threads or similar lugs. The crammer sleeve will be utilized to move axially oriented material into the neck finishing cavities 25 as will be described later with reference to FIG. 5. While cavities for threads are shown, it would also be possible to form similar projections such as lugs or the like. Blow pin 11 is used to convey gasses from a high pressure source (not shown) into the parison 17 from which the article is to be formed. These gasses expand the parison into the mold to form the finished article. Tube stop/ejector sleeve 15 fits over crammer sleeve 13 to limit the position of the end of the parison 17 when the parison 17 is inserted over the crammer sleeve 13. The ejector sleeve is equipped with an actuator (not shown) to slide it over the crammer sleeve 13 and blow pin 11 to eject the bottle at the end of the cycle. The inside diameter of the ejector sleeve 15 need not be the same diameter as the outside diameter of the crammer sleeve 13. Clamping means 19 open and close on parison 17 to clamp it to the crammer sleeve 13. Mold means 21 close about the parison 17 to confine the tube in the neck cavity and open to allow the bottle to be ejected.

Figure 2:
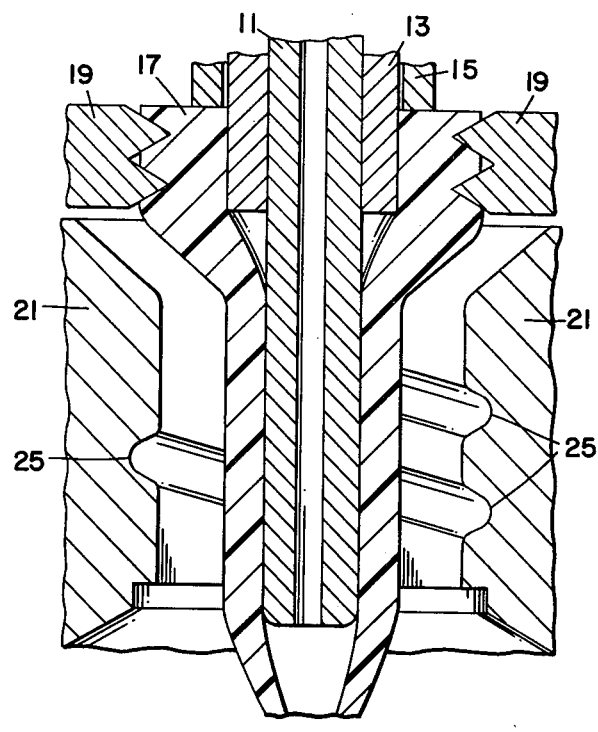
FIG. 2 is a view as in FIG. 1 wherein the parison has been axially oriented.

FIG. 2 shows the neck down of the parison 17 due to stretching or axial orientation of the parison by conventional axial clamp and stretching means (not shown). The parison 17 necks down in the bottle neck area and stops at a first wall thickness when its inside diameter reaches the outside diameter of the blow pin 11. The necking process continues to neck down below the blow pin 11 to a second thinner wall thickness until the desired axial orientation is reached for the body of the bottle.

Figure 3:
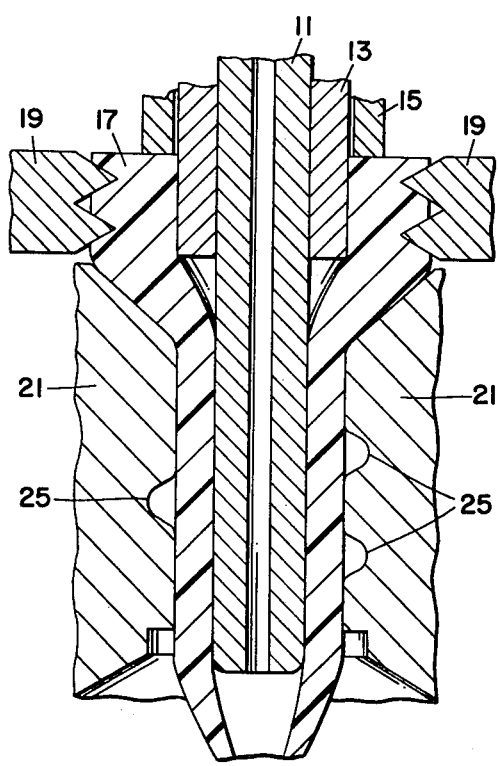
FIG. 3 is a view as in FIG. 2 wherein the mold cavities have been closed about the axially oriented parison.

FIG. 3 illustrates mold means 21 with neck finishing cavities 25 closed around the oriented parison to confine it in mold. The closure of the mold means above the neck finish is designed to conform to the tapered tube shape below the clamp jaws.

Figure 4:
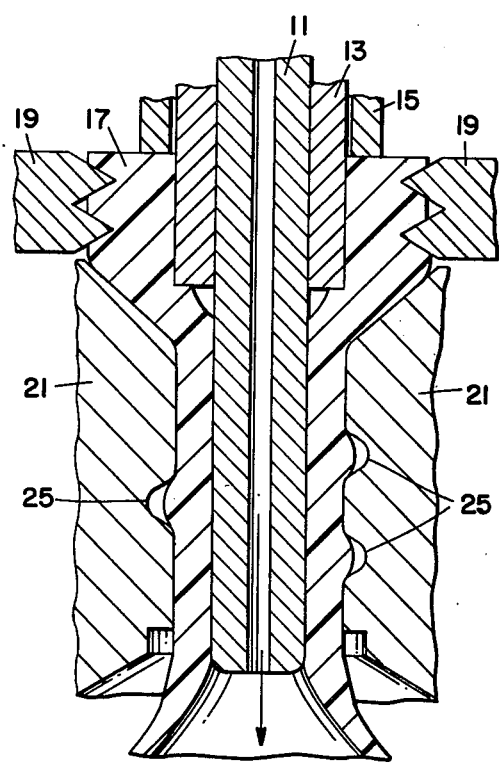
FIG. 4 is a view as in FIG. 3 illustrating initial movement of the crammer sleeve.

FIG. 4 illustrates when blow air is introduced into the mold means via blow pin 11 to radially expand the axially oriented parison 17, thus producing a biaxially oriented container and crammer sleeve 13 starts to move downward.

Figure 5:
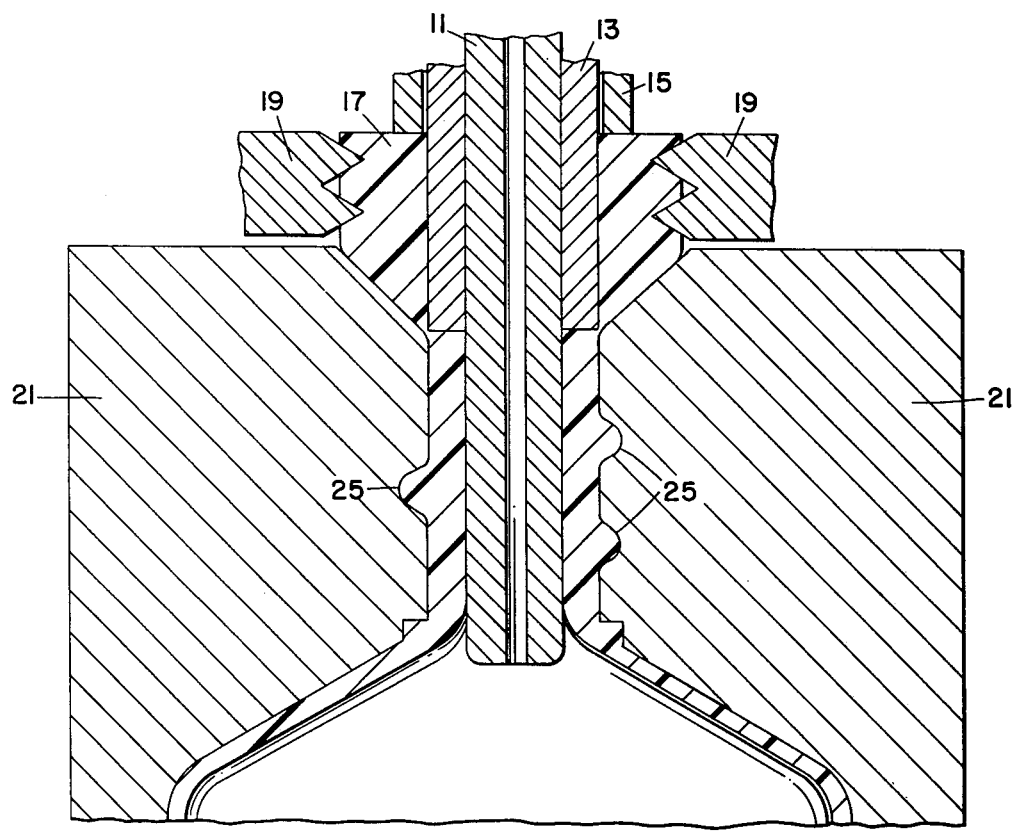
FIG. 5 is a view as in FIG. 4 after blow pressure has been applied to the parison and threads have been formed.

FIG. 5 illustrates crammer sleeve 13 having been moved toward the neck finishing cavities, thereby forcing an inner portion of the parison 17 into the neck finishing cavities 25.

It is important to note that the timing relationship between the operations illustrated in FIG. 4 and FIG. 5 is critical due to cooling of the parison. It is within the scope of the invention to cram the neck region before, while, or after blowing of the bottle body depending upon cooling residence time required for the particular material utilized. It is also within the scope of the invention to control the blow pin temperature either by direct application of heat or use of insulated material for the blow pin to prevent the neck material from cooling during the stretching of the parison and closing of the mold means thereby enhancing the ability of the crammer to displace the material into the neck cavities (threads).

Figure 6:
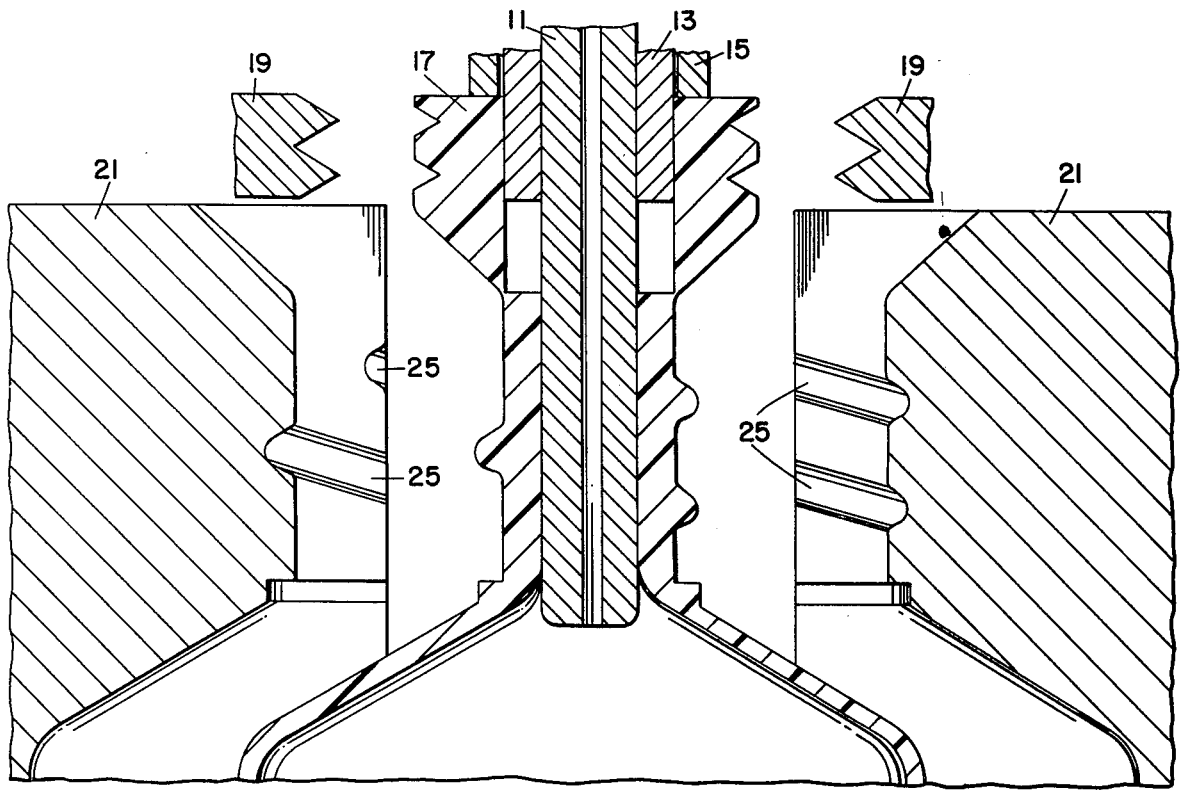
FIG. 6 is a view as in FIG. 5 after the molds have separated and the crammer sleeve has been retracted.

FIG. 6 shows crammer sleeve 13 retracted away from the bottle neck, the clamping means 19 opened and the mold means 21 opened. Tube stop/ejector sleeve 15 has not moved yet but provides reaction force to that produced by crammer sleeve 13 on the bottle.

Figure 7:
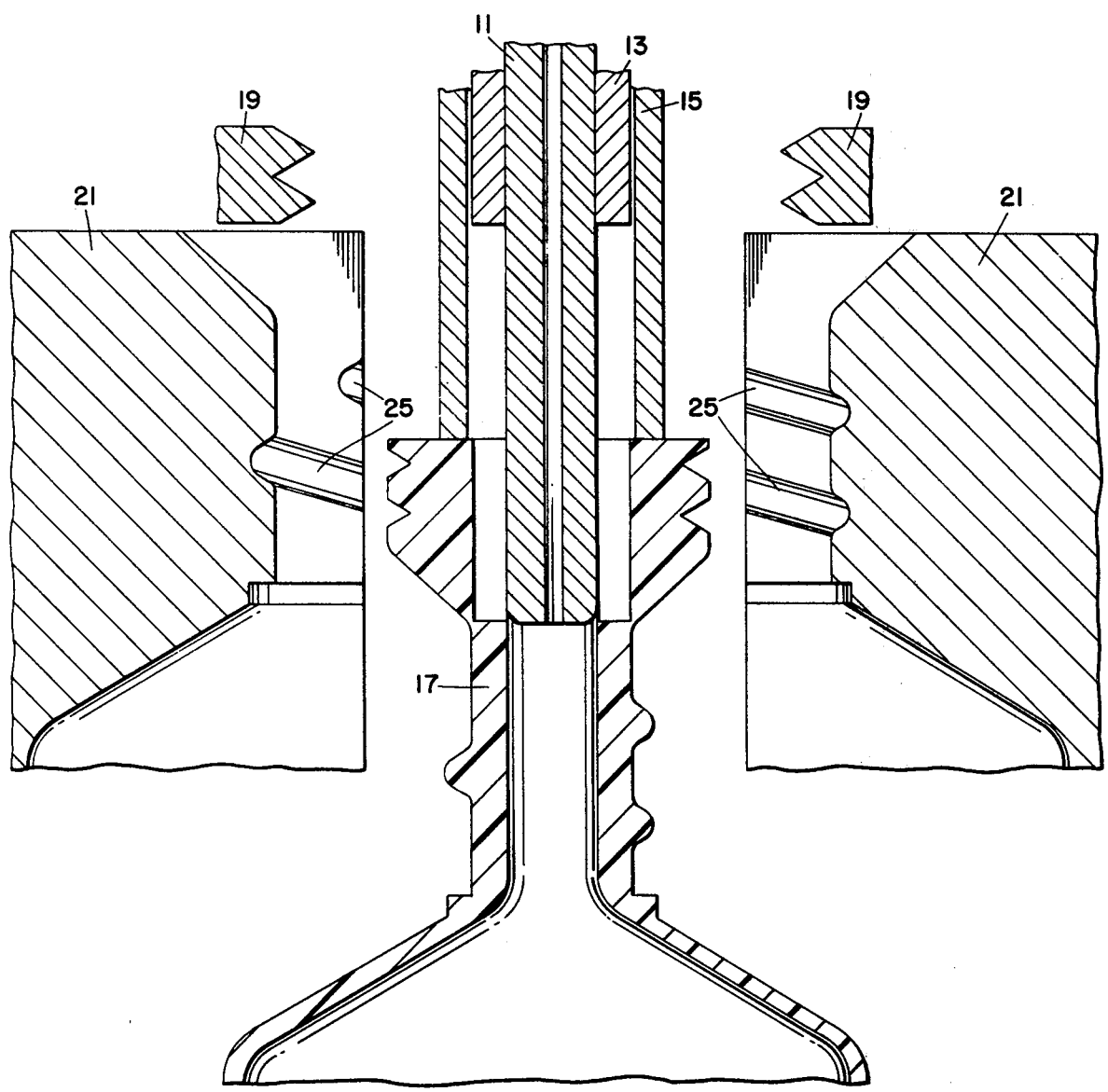
FIG. 7 is a view as in FIG. 6 illustrating removal of the finished container.

FIG. 7 shows stop tube/ejector sleeve 15 having pushed the bottle the remainder of the way off the crammer sleeve 13 and off the blow pin 11.

Figure 8:
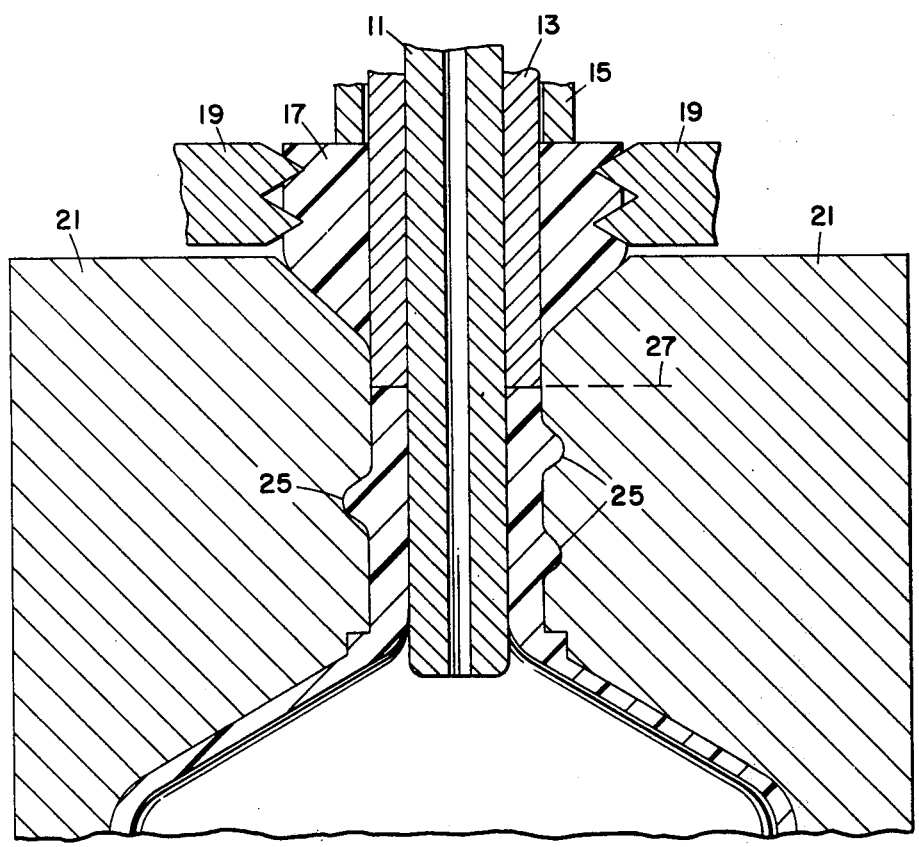
FIG. 8 is a full cross-sectional view of an alternate embodiment of the instant invention which facilitates in-mold neck finishing.

FIG. 8 illustrates an alternate design wherein the crammer sleeve 13 is extended into the neck so that the end of the crammer sleeve 11 forms the final sealing face of the bottle at interface 27 leaving only a small web of material to be cut away in the finishing operation.

This invention is applicable to the formation of any article having biaxial molecular orientation and a relatively small neck and/or thread area compared with the body portion of said article. The invention is applicable for the production of these articles from any orientable thermoplastic resin. Exemplary resins include polyolefins, poly(vinyl chlorides), acrylonitrile-butadiene-styrene polymers, styrene-butadiene copolymers, various styrene polymers and copolymers, polyamides, polyvinylidene chloride polymers and copolymers, and the like. Preferred resins include crystalline polymers such as polymers of at least one mono-1-olefin having 2–8 carbon atoms per molecule, more preferably, polymers and copolymers of ethylene, propylene, and 1-butene, with polypropylene being especially preferred.

While preferred embodiments of the invention have been illustrated and described, it will be appreciated that variations therefrom may be made without departing from the scope of the invention as defined in the appended claims.

I claim:

1. Apparatus for biaxially blow molding hollow plastic articles to provide a finished neck of axially oriented material comprising:

a tubular parison of partially crystalline material;

a tubular blow pin;

a cramming sleeve means slideably mounted over said tubular blow pin, said tubular parison having one end thereof mounted over said tubular blow pin and said cramming sleeve means, said tubular parison, said tubular blow pin and said cramming sleeve means being concentric of an axis;

mold means having neck finishing cavities contained therein positioned to close over said one end of said tubular parison and over said tubular blow pin; and, clamping means adjacent to said mold means, means to axially orient said tubular parison with respect to said axis, means operable to move said clamping means toward said cramming sleeve means to grasp said one end of said tubular parison on said tubular blow pin and said cramming sleeve means before said tubular parison is axially oriented and necks down over said tubular blow pin, means to close said neck finishing cavities of said mold means about the portion of said tubular parison positioned over said tubular blow pin after said tubular parison has been axially oriented, and means to move said cramming sleeve means along said axis to force a portion of the axially oriented tubular parison into the neck finishing cavities, said tubular blow pin having means introducing blow air to radially expand the remainder of said tubular parison to form a finished container.

* * * * *

UNITED STATES PATENT AND TRADEMARK OFFICE
CERTIFICATE OF CORRECTION

PATENT NO. : 4,116,607
DATED : September 26, 1978
INVENTOR(S) : Richard W. LeGrand It is certified that error appears in the above—identified patent and that said Letters Patent are hereby corrected as shown below:

Column 1, line 23 " vinylidehe " should read -- vinylidene --.

Signed and Sealed this

Nineteenth Day of December 1978

[SEAL]

Attest:

RUTH C. MASON
Attesting Officer

DONALD W. BANNER
Commissioner of Patents and Trademarks